July 27, 1965 H. L. KRIPAL 3,196,774
METHOD OF AND MEANS FOR CIRCULATING AIR WITHIN CLOSED BUILDINGS
Filed June 27, 1962
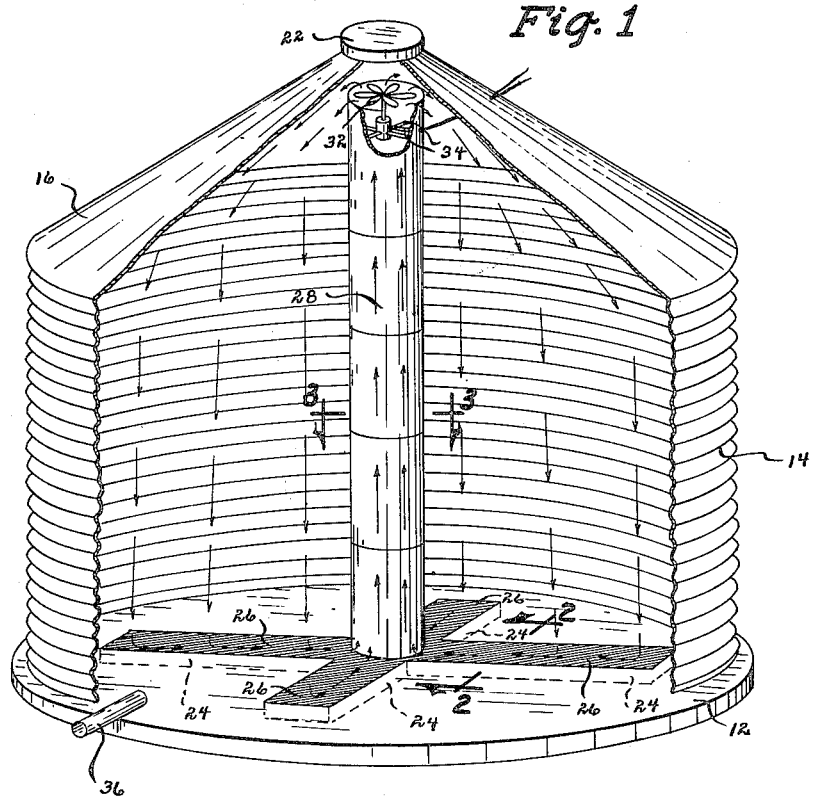
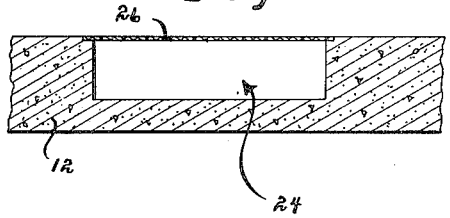
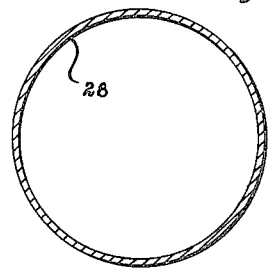
INVENTOR
HENRY L. KRIPAL
BY
ATTORNEYS

United States Patent Office 3,196,774
Patented July 27, 1965

3,196,774
METHOD OF AND MEANS FOR CIRCULATING AIR WITHIN CLOSED BUILDINGS
Henry L. Kripal, Columbus, Nebr., assignor to Behlen Manufacturing Company, Inc., Columbus, Nebr., a corporation of Nebraska
Filed June 27, 1962, Ser. No. 205,676
3 Claims. (Cl. 98—55)

This invention relates to storage bins and more particularly to air circulating storage bins for grain and the like.

Ventilated storage bins heretofore known in the art have suffered from several drawbacks. One problem encountered in previous storage bins of this general type is that they are not designed to be air and/or water tight and, thusly, do not adequately protect the grain stored therein from atmospheric changes in humidity. Another drawback is the inability of such previous devices to keep the moisture content of the grain contained therein at a constant level. Still another drawback is the inability of previous units to keep the moisture content of the grain or the like stored therein uniform throughout the entire cubic area of the storage bin.

Therefore, one of the principal objects of my invention is to provide a grain aerating storage bin that is air and water tight.

Another object of this invention is to provide a grain aerating storage bin that will protect the material stored therein from atmospheric changes in humidity.

A still further object of my invention is to provide a grain aerating storage bin that will maintain the moisture level of the material contained therein at a constant level.

A still further object of this invention is to provide a grain aerating storage bin that will maintain the moisture content of the grain or like material stored therein uniform throughout the entire cubic area of the storage bin.

And still further objects of my invention are to provide a material aerating storage bin that is economical in manufacture, durable in use, and refined in appearance.

These and other objects will become apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing in which:

FIG. 1 is a side perspective view of my installed device with sections cut away to more fully illustrate its construction, FIG. 2 is an enlarged cross-sectional view of one of the collecting troughs and is taken on line 2—2 of FIG. 1, and FIG. 3 is an enlarged cross-sectional view of the vertical pipe, taken on line 3—3 of FIG. 1.

In these drawings, the numeral 12 generally designates a ground platform or other suitably shaped base and/or floor member of the storage bin and is preferably of concrete.

The numeral 14 generally designates the substantially vertical wall portion of my storage bin. Naturally, the wall 14 closely follows the geometric shape of the base or floor 12, and, for reasons of strength and economy, is preferably constructed of corrugated steel. However, any airtight building material would be suitable. As will be seen in the drawings, the wall 14 is disposed on top of the base 12 and, indeed, may be sunk into the base 12 at the time it is poured in order to enhance the airtight qualities of the structure, or otherwise sealed. The wall 14 may extend upwardly from the base 10 any suitable distance.

The numeral 16 generally designates a roof means, preferably of convex or conical shape, that encloses the top of the structure formed by the base 12 and the wall 14. The roof 16 is, of course, suitably sealed at its juncture with the wall 14. At the top of the roof 16 is an access aperture and which preferably is located at the central apex of the roof 16. The numeral 22 generally designates a detachable cap means that closely covers the access aperture and is adapted to seal the access aperture.

The numeral 24 generally designates a plurality of depressions that extend radially from a substantially central and/or concentric point in the base 12. In the drawings, these depressions 24 are shown to be rectangular and in the shape of a cross. However, they may be of any suitable geometric design and plurality. The numeral 26 generally designates a cover suitably fitted over each of the depressions 24. These covers 26 have a plurality of perforations of a sufficiently small size to stop the material to be stored from passing through and are, in the preferred embodiment, constructed of metal. These covers 26 may be of screen grid construction.

The numeral 28 generally designates an elongated hollow cylindrical member located interior of the wall 14 and having its longitudinal axis substantially vertically extending from the central junction of the radially extending depressions 24. As will be seen from the drawings, the base of the cylinder 28 is disposed within the junction of the depressions 24 and the top of the cylinder 28 extends to a point above the level to which the grain or like will come when the storage bin is filled. The tube cylinder 28 has its bottom communicating with the depressions 24 so as to permit air to pass freely therefrom. The numeral 32 generally designates a power driven fan means located within the cylinder 28 and having its axis of rotation substantially concentric in relation to the longitudinal axis of the cylinder 28. The fan means 32 is adapted to move air upwardly through the cylinder 28 and, for ease of maintenance, is preferably located at the top end thereof. Also, for ease of maintenance and to reduce fire hazard, it is suggested that the fan 32 be powered by an electric motor. The aperture should be of sufficient diameter to accommodate the removal and replacement of the fan 32 and its attendant elements. The fan means 32 may be supported at the top of the cylinder 28 by any suitable means, such as by the brackets at 34 which are adapted to facilitate the easy upward removal of the fan means 32. The storage bin may have any suitable unloading tube means, as at 36.

In operation, the above described bin is filled with material, such as grain, to a level that is substantially at the top of the wall 14. The top aperture is then closed and sealed by means of the cap 22 and the electric fan means 32 is started. The fan 32 draws air upwardly through the cylinder 28. Thus, by the partial vacuum creaated at the base of the cylinder 28 and within the depressions 24, and created at the top of the storage bin, the air is forced generally diffusedly downwardly through the grain or like material in the storage bin, hence through the perforated covers 26, thence into the depressions 24, into the base of the cylinder 28, and thence upwardly through the cylinder 28. This circulation of air is continuous and thus it will be seen that the material in the storage bin is aerated by means of the recirculating air and the moisture content, as well as the temperature thereof, will be uniformly maintained throughout the cubic area of the storage bin and its contents. By this means, moisture is prevented from excessively building up in any one spot and rotting is prevented. Also, hot spot areas in the grain or like will be eliminated.

Some changes may be made in the construction and arrangement of my method of and means for circulating air within closed buildings without departing from the real spirit and purpose of my invention, and it is my intention to cover by my claims, any modified forms of structure or use of mechanical equivalents which may be reasonably included within their scope.

I claim:

1. A material aerating means for a closable storage bin having walls, floor and roof,
   a hollow cylinder member disposed within said storage bin,
   said hollow cylinder member having at least one aperture near one end and open at its other end,
   said hollow cylinder member being vertically disposed in said storage bin and having its said one end in contact with the floor of said storage bin,
   at least one radially extending depression in said floor of said storage bin, the interior of said depression being in communiaction with the interior of said hollow cylinder member,
   and a powered fan means disposed within said hollow cylinder member adapted to circulate air from the interior of said storage bin through said depression and said hollow cylinder member thence back into the interior of said storage bin.

2. A material aerating means for a closable storage bin having walls, floor and roof,
   a hollow cylinder member disposed within said storage bin,
   said hollow cylinder member having at least one aperture near one end and open at its other end,
   said hollow cylinder member being vertically disposed in said storage bin and having its said one end in contact with the floor of said storage bin,
   said open end of said cylinder defining the top end thereof and terminating at a point above the level to which storage bin is to be filled,
   said hollow cylinder member being substantially located in the center of said storage bin,
   at least one radially extending depression in said floor of said storage bin in communication with said aperture in said hollow cylinder member,
   a powered fan means disposed within said hollow cylinder member adapted to circulate air from the interior of said storage bin through said depression, said aperture and said hollow cylinder member and thence back into the interior of said storage bin,
   and a perforated cover means disposed over said depression and lying substantially within the horizontal plane of said floor.

3. An aerating storage bin, comprising in combination,
   a closed cylindrical compartment having a cone shaped roof,
   a hollow open ended cylindrical duct vertically disposed in the center of said compartment, the lower open end of said duct being mounted on the bottom of said compartment,
   means providing communication between the lower open end with the lower portion of said compartment,
   the upper end of said duct being positioned below the apex of said cone shaped roof,
   a powered fan means disposed within said duct adapted to circulate air from the interior of said compartment into said lower open end of said duct and outwardly through the upper end of said duct where the air is directed unto said cone shaped roof and deflected outwardly and downwardly with respect to said duct upper end back into the interior of said compartment.

References Cited by the Examiner

UNITED STATES PATENTS

| | | | |
|---|---|---|---|
| 1,175,237 | 3/16 | Cavanaugh et al. | 98—54 |
| 1,294,503 | 2/19 | McMahen | 98—54 X |
| 1,995,551 | 3/35 | Shodron | 98—54 X |
| 2,560,141 | 7/51 | Tipps | 98—55 |

FOREIGN PATENTS 501,903   3/51   Belgium.

ROBERT A. O'LEARY, *Primary Examiner.*